United States Patent
Downes (10) Patent No.: US 8,225,696 B2
(45) Date of Patent: Jul. 24, 2012

(54) METHOD OF MANUFACTURING A POCKET TOOL

(75) Inventor: Josh Downes, Henderson, NV (US)

(73) Assignee: Keyport, Inc., Henderson, NV (US)

( * ) Notice: Subject to any disclaimer, the term of this patent is extended or adjusted under 35 U.S.C. 154(b) by 0 days.

(21) Appl. No.: 12/891,796

(22) Filed: Sep. 27, 2010

(65) Prior Publication Data

US 2011/0072870 A1 Mar. 31, 2011

Related U.S. Application Data

(63) Continuation-in-part of application No. PCT/US2010/050451, filed on Sep. 27, 2010, and a continuation-in-part of application No. 12/808,358, filed as application No. PCT/US2008/086896 on Dec. 15, 2008, and a continuation-in-part of application No. 12/442,098, filed as application No. PCT/US2007/078960 on Sep. 19, 2007, now Pat. No. 8,146,736.

(60) Provisional application No. 61/246,082, filed on Sep. 25, 2009, provisional application No. 61/007,730, filed on Dec. 14, 2007, provisional application No. 60/845,887, filed on Sep. 19, 2006, provisional application No. 60/845,998, filed on Sep. 20, 2006.

(51) Int. Cl.
*B21K 13/00* (2006.01)

(52) U.S. Cl. .................. 76/110; 20/402.06; 20/402.11; 20/428

(58) Field of Classification Search ............... 29/402.01, 29/402.06, 402.11, 825, 842, 854, 428; 76/110
See application file for complete search history.

(56) References Cited

U.S. PATENT DOCUMENTS

| | | | |
|---|---|---|---|
| 1,665,016 A | 4/1928 | Benham et al. | |
| 1,936,273 A | 11/1933 | Segal | |
| 1,996,933 A | 4/1935 | Segal | |
| 2,076,895 A | 4/1937 | Johnston | |
| 2,493,330 A | 1/1950 | Zimmerman | |
| 2,503,380 A | 4/1950 | Derby | |
| 2,541,333 A | 2/1951 | Campbell | |
| 2,558,265 A | 6/1951 | Mosch | |
| 2,560,595 A | 7/1951 | Poncar | |
| 2,575,424 A * | 11/1951 | Mitchell | 70/456 R |
| 2,605,632 A | 8/1952 | Lamonde | |
| 2,637,994 A | 5/1953 | Harrison, Jr. et al. | |

(Continued)

FOREIGN PATENT DOCUMENTS

EP 1 621 100 A2 2/2006

(Continued)

OTHER PUBLICATIONS

International Preliminary Report on Patentability dated Jun. 15, 2010, Written Opinion of the International Searching Authority dated May 18, 2009, and International Search Report dated May 18, 2009, for International PCT/US2008/086896, filed Dec. 15, 2008.

(Continued)

*Primary Examiner* — Carl Arbes
(74) *Attorney, Agent, or Firm* — Pearne & Gordon LLP (57) ABSTRACT

A key conversion workstation converts conventional keys, in their many shapes and sizes, into a key assembly having a standardized head that can be used, among other uses, within a key organizing device.

8 Claims, 8 Drawing Sheets

U.S. PATENT DOCUMENTS

| | | | |
|---|---|---|---|
| 2,640,347 A | 6/1953 | Majeski |
| 2,669,859 A | 2/1954 | Hudson, Jr. |
| 2,695,511 A | 11/1954 | Wing et al. |
| 2,789,613 A | 4/1957 | Corsaw |
| 2,790,319 A | 4/1957 | Brunner |
| 3,004,422 A | 10/1961 | Starrett |
| 3,147,609 A | 9/1964 | Ryan |
| 3,328,986 A | 7/1967 | Ralton |
| 3,354,678 A | 11/1967 | Stifelman |
| 3,407,636 A | 10/1968 | Kovacevic |
| 3,457,746 A | 7/1969 | Glassman |
| 3,606,777 A | 9/1971 | Watson |
| 3,618,346 A | 11/1971 | Humphrey |
| 3,729,965 A | 5/1973 | Gartner |
| 3,765,200 A | 10/1973 | Vogt |
| 3,813,907 A | 6/1974 | Jones, Jr. et al. |
| 3,832,874 A | 9/1974 | Willis |
| 3,950,973 A | 4/1976 | Grasnianski |
| 4,006,613 A | 2/1977 | Zion |
| 4,305,267 A | 12/1981 | Nish et al. |
| 4,417,410 A | 11/1983 | Freedom |
| 4,569,215 A | 2/1986 | McCarthy |
| 4,601,185 A | 7/1986 | Sheldon |
| 4,646,913 A | 3/1987 | Wing et al. |
| 4,909,054 A | 3/1990 | Fox |
| D307,863 S | 5/1990 | Boag |
| 4,941,335 A | 7/1990 | Allen |
| 4,951,489 A | 8/1990 | Proch |
| 4,951,819 A | 8/1990 | Gebert |
| 5,123,579 A | 6/1992 | Sugiyama |
| 5,215,190 A | 6/1993 | Hoffpauir, Jr. |
| 5,228,563 A | 7/1993 | Stringham |
| 5,232,086 A | 8/1993 | Montanari |
| 5,487,291 A | 1/1996 | Voigt |
| 5,495,942 A | 3/1996 | Izhak |
| 5,544,510 A | 8/1996 | Botteon et al. |
| 5,943,889 A | 8/1999 | Chiu |
| 6,092,405 A | 7/2000 | Berwick |
| 6,237,756 B1 | 5/2001 | Caudle |
| 6,367,298 B1 | 4/2002 | Janssen et al. |
| 6,371,286 B1 | 4/2002 | Montanari |
| 6,473,022 B1 | 10/2002 | Wu |
| 6,604,308 B1 | 8/2003 | Robles |
| 6,755,061 B2 | 6/2004 | Herzenberg |
| 6,763,938 B1 | 7/2004 | Nelson |
| D499,323 S | 12/2004 | Smith |
| 6,892,558 B2 | 5/2005 | Chodosh |
| 7,055,352 B2 | 6/2006 | Meyerson et al. |
| D530,186 S | 10/2006 | Johansson |
| 7,360,383 B1 | 4/2008 | Chang |
| D569,227 S | 5/2008 | Boenisch |
| D592,935 S | 5/2009 | Mesh et al. |
| D618,983 S | 7/2010 | Downes |
| D624,305 S | 9/2010 | Downes |
| 2003/0167810 A1 | 9/2003 | Frias |
| 2003/0172696 A1 | 9/2003 | Regina |
| 2004/0055347 A1 | 3/2004 | Herzenberg |
| 2004/0069661 A1 | 4/2004 | Telleen |
| 2005/0103070 A1 | 5/2005 | Meyerson et al. |
| 2005/0103071 A1 | 5/2005 | Ng |
| 2005/0199628 A1 | 9/2005 | Van Handel et al. |
| 2005/0204789 A1 | 9/2005 | Brion Camean et al. |
| 2006/0044109 A1 | 3/2006 | Griffits et al. |
| 2006/0044116 A1 | 3/2006 | Mehler et al. |
| 2006/0086163 A1 | 4/2006 | Downes |
| 2010/0000885 A1 | 1/2010 | Downes |
| 2011/0016937 A1 | 1/2011 | Downes |

FOREIGN PATENT DOCUMENTS

| | | |
|---|---|---|
| WO | 9933370 | 7/1999 |
| WO | 03/082063 A1 | 10/2003 |
| WO | 2007/050442 A1 | 10/2006 |
| WO | 2008036783 A1 | 3/2008 |
| WO | 2011038372 A1 | 3/2011 |

OTHER PUBLICATIONS

International Preliminary Report on Patentability dated Apr. 23, 2008, Written Opinion of the International Searching Authority dated Feb. 16, 2007, and International Search Report dated Feb. 16, 2007, for International PCT/ US2006/040972, filed Oct. 20, 2006.

International Preliminary Report on Patentability dated Mar. 24, 2009, Written Opinion of the International Searching Authority dated Dec. 8, 2008, and International Search Report dated Dec. 17, 2008, for International PCT/US2007/078960, filed Sep. 19, 2007.

International Search Report dated Feb. 17, 2011, for International PCT/US2010/050451, filed Sep. 27, 2010.

* cited by examiner

METHOD OF MANUFACTURING A POCKET TOOL

RELATED APPLICATIONS

This application claims the benefit of U.S. Provisional Application No. 61/246,082, filed on Sep. 25, 2009 and is:

a continuation of International Application No. PCT/US10/50451, filed on Sep. 27, 2010 even date herewith; and a continuation-in-part of U.S. application Ser. No. 12/808,358, filed June 15, 2010, which is the U.S. National stage of International Application No. PCT/US08/86896, filed Dec. 15, 2008, which claims the benefit of U.S. Provisional Application No. 61/007,730, filed Dec. 14, 2007; and a continuation-in-part of U.S. patent Ser. No. 12/442,098, filed Mar. 19, 2009 now U.S. Pat. No. 8,146,736, which is the U.S. National stage of International Application No. PCT/US07/78960, filed Sep. 19, 2007, which claims the benefit of U.S. Provisional Application No. 60/845,998, filed Sep. 20, 2006, and U.S. Provisional Application No. 60/845,887, filed Sep. 19, 2006.

The entire teachings of the above applications are incorporated herein by reference.

BACKGROUND

Despite advances in lock technology, individuals often carry multiple keys on a daily basis. Typically, the individual attaches the multiple keys together on a key ring extending through a hole in the head of each key. While the keys are bundled together, they can be cumbersome to use, transport, or store.

While various devices have been devised to replace the key ring and simplify key storage and organization, none have been particularly successful. Because conventional keys are available in various shapes and sizes, the prior art has been unable to offer a successful workable solution. One prior solution was to design a holder to fit the largest key head, which also required the holder to be much longer and wider than the key blade and bulky. In another prior solution, a holder was designed to fit keys having key heads of the same or similar size. In yet another solution, key heads were cut to a smaller size and attached within the holder, but the fitting tended to be loose due to differences in key thicknesses, etc.

In addition to keys, people frequently carry other devices either attached to a key ring or carried separately. These devices can include useful tools that may be carried in a holder such as multi-tools and army knives. Like conventional keys, most of these tools, such as bottle and can openers, knives, scissors, screw drivers, and saws include elongated bodies.

SUMMARY

A particular embodiment of the invention is a method of manufacturing a universal pocket tool for a universal organizer. The method can include providing an elongated pocket tool having a working end and a gripping end along a longitudinal axis. The method can further include providing a first mounting plate having a first mating feature and a second mounting plate having a second mating feature, the first mating feature dimensioned to mate with the second mating feature.

The method can then include machining the gripping end into a mounting stub having a mounting feature. The mounting stub can have a predetermined thickness, a predetermined width, and a maximum length relative to the longitudinal axis.

The mounting stub can then be positioned between the first mounting plate and the second mounting plate such that the mounting feature of the mounting stub is aligned with the first mating feature of the first mounting plate and the second mating feature of the second mounting plate. The mounting feature can then be engaged with the first and second mating features. The method can then integrate the first mounting plate with the second mounting plate to secure the mounting stub within an integrated mounting head, such as by welding.

In accordance with the particular method, the elongated hand tool can be a key or an electronic device. Other elongated devices can also be included.

Furthermore, machining the gripping end can include machining an orifice through the gripping end as a mounting feature. That machining can include machining a plurality of orifices through the gripping end.

In accordance with a more particular embodiment, the first and second mounting plates comprises can be formed from a plastic material. Specifically, the plastic material can comprise nylon.

Another particular embodiment of the invention is a standardized pocket tool for a universal organizer. An elongated pocket tool can have a working end and a mounting stub along a longitudinal axis. The mounting stub can have a mounting feature, a predetermined thickness, a predetermined width, and a maximum length relative to the longitudinal axis. In a more particular embodiment, the elongated hand tool can be a key or an electronic device.

An integrated mounting head can be secured to the mounting stub. The integrated mounting head can include a first mounting plate having a first mating feature and a second mounting plate having a second mating feature. The first mating feature can be dimensioned to mate with the second mating feature. The mounting stub can be disposed between the first mounting plate and the second mounting plate such that the mounting feature of the mounting stub can be aligned with the first mating feature of the first mounting plate. The second mating feature of the second mounting plate and the mounting feature can be engaged with the first and second mating features.

More particularly, the mounting feature can include an orifice. Specifically, the mounting feature can include a plurality of orifices.

The first mounting plate and the second mounting plates can be integrally welded.

The first mounting plate and the second mounting plate can be plastic. More specifically, the plastic comprises nylon.

Another particular embodiment of the invention is a workstation for manufacturing a standardized pocket tool for a universal organizer. The workstation can include a first staging area, a machining station, a second staging area, and an integration station.

The first staging area can receive an elongated pocket tool having a working end and a gripping end along a longitudinal axis.

The machining station can machine the gripping end into a mounting stub having a mounting feature. The mounting stub can have a predetermined thickness, a predetermined width, and a maximum length relative to the longitudinal axis. More particularly, the machining station can include a first station for cutting the gripping end into a proto-stub of the predetermined width and the length and forming the mounting features into the proto-stub and a second station for dimensioning the proto-stub into the predetermined thickness to form the mounting stub.

The second staging area can receive a first mounting plate having a first mating feature and a second mounting plate having a second mating feature, where the first mating feature can be dimensioned to mate with the second mating feature. The mounting stub can then be positioned between the first mounting plate and the second mounting plate such that the mounting feature of the mounting stub can be aligned with the first mating feature of the first mounting plate and the second mating feature of the second mounting plate. The mounting feature can then engage with the first and second mating features.

The integration station can integrate the first mounting plate with the second mounting plate to secure the mounting stub within an integrated mounting head. In particular, the integration station can be a welding station, more particularly an electrostatic welder.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

To simply and improve the task of carrying multiple tools in a pocket or purse, the tools are fitted with a standardized head for operation within a compact organizer device. Examples of mechanical pocket tools include, but are not limited to, keys, knives, saws, screw drivers, scissors, bottle and can openers, and whistles. The pocket tools can also be electronic devices, such as solid state memory devices (e.g. flash drives), LED flashlights, and fobs. It should be understood that various pocket tools can be combined into a single standardized head, and can employ hinges and the like. While all elongated pocket tools are encompassed by embodiments of the invention, the invention will generally be described with reference to the conversion of conventional keys.

Figure 1:
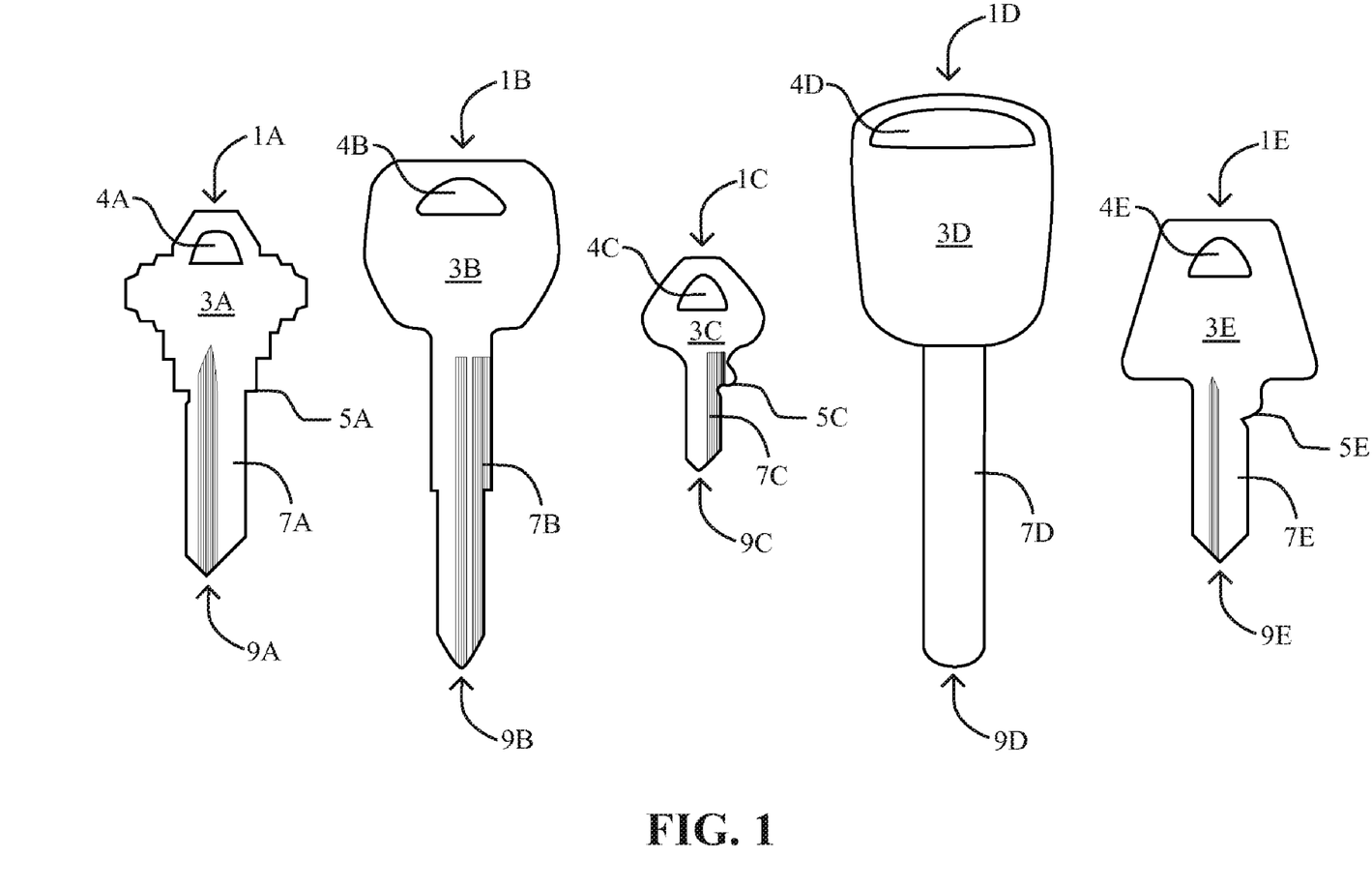
FIG. 1 is a schematic view of common commercially-available blade-type keys.

FIG. 1 is a schematic view of common commercially-available blade-type keys. As shown, each conventional key 1A, 1B, . . . , 1E includes a respective key head or bow 3A, 3B, . . . , 3E having respective eyelets 4A, 4B, . . . , 4E, a shoulder 5A, 5C, 5E, a blade 7A, 7B, . . . , 7E, and a tip 9A, 9B, . . . , 9E. As well known, the key head 3 is used for gripping the key while performing its intended function. The key head 3 also typically includes an eyelet 4 for attaching the key to a key ring. In some cases, the shoulder acts 5 as a positive stop when the key is inserted into a keyway. In other cases, the key does not have a shoulder stop and instead relies on the tip of the key to act as the positive stop. Conventional keys typically have millings or grooves along the blade 7 to give it a unique profile to slide into the keyway and teeth to activate lock pins. In addition, conventional keys can also have holes, grooves, and other profiles cut into the top and bottom of the blade 7 depending on the key type. Conventional keys are fabricated from a range of materials, including brass, steel, aluminum, and plastic.

Conventional keys have numerous physical differences. They come in various widths to fit different keyways. It has been found that most key blade widths are less than or equal to 0.460". Similarly, conventional key blades come in various lengths to fit different keyways. Conventional key blades also come in various thicknesses ranging from 0.050" up to 0.165", with the majority ranging between 0.070" to 0.125" thick. Sometimes groove patterns are cut at an angle such that the blade is at a different angle than the head of the key.

Some high security keys are also equipped with electronic Radio Frequency Identification (RFID) chips and coils that verify the key's unique identity with the host lock or ignition. Typically these chips are located within a plastic key head. Other key types are also in use, such as cylindrical (bit and barrel) keys. However, keys with straight blades are especially common.

Described in more detail below is a more particular method for converting conventional keys in their many shapes and sizes to keys that can be used, among other uses, within a key organizing device, utilizing a key conversion workstation.

Figure 2:
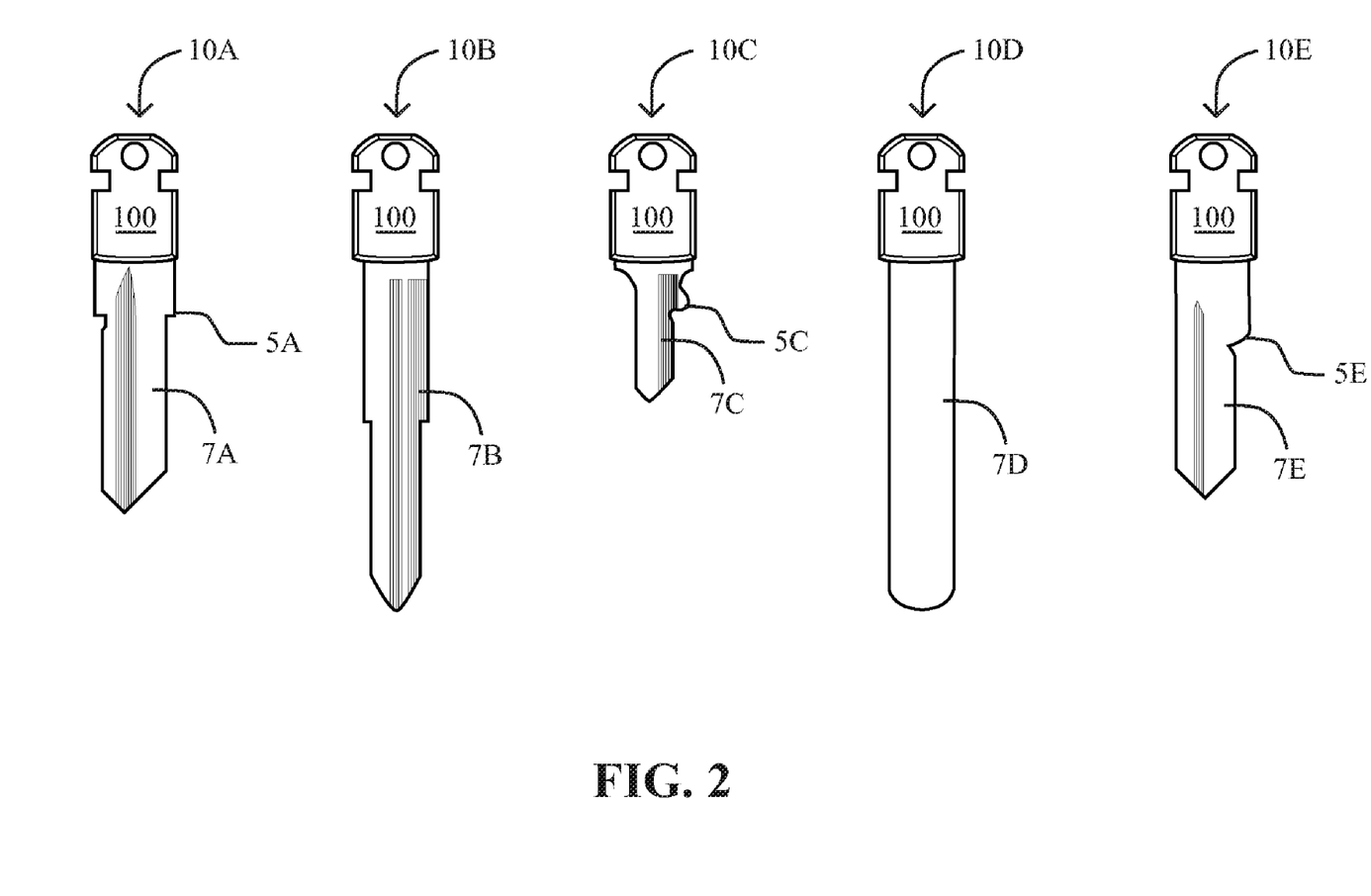
FIG. 2 is a schematic view of the key types of FIG. 1 after modification according to a particular embodiment of the invention.

FIG. 2 is a schematic view of the key types of FIG. 1 after modification according to a particular embodiment of the invention. As shown, the conventional keys 1A, 1B, . . . , 1E (FIG. 1) are modified to have a standardized key head 100. Details of the standardized hey head 100 will be described in more detail below.

Converting conventional keys to modified key assemblies 10A, 10B, . . . , 10E standardizes conventional keys by making all key heads one uniform size in length, width, and height. This conversion can reduce the bulk and weight of a conventional key chain, allows for more organizational options, and allows a much improved user experience. In a particular embodiment, a key organizer holding six key assemblies can weigh less than the original six keys on a key ring.

Without the use of the standardized head 100 it can be very difficult to convert conventional keys into a standardized geometry in an effective manner. The standardized head allows the use of nearly any conventional key in an organizational device and creates a plethora of other options with regard to key storage, organization, and customization. The many key materials, widths, lengths, thicknesses, forms, integrated electronics, etc. present various scenarios for converting conventional keys 1 to standardized keys 10.

A particular embodiment of the standardized key assemblies is particularly useful in the context of a key organizer device. As described in the incorporated applications, a particular key organizing device can house a plurality of keys having a slideable organizer-mountable key head. The device can be constructed of a single housing or can be an expandable device, constructed from a number of separate key housings. The device can also be constructed to house insertable items other than, or in addition to, standardized keys. Items that are too large to be housed within the housing can be attached using suitable modules, as described in the incorporated application. The key assemblies have a universal head that can be inserted into, removed from, and transferred between organizing devices, and is adaptable to other devices.

Figure 3:
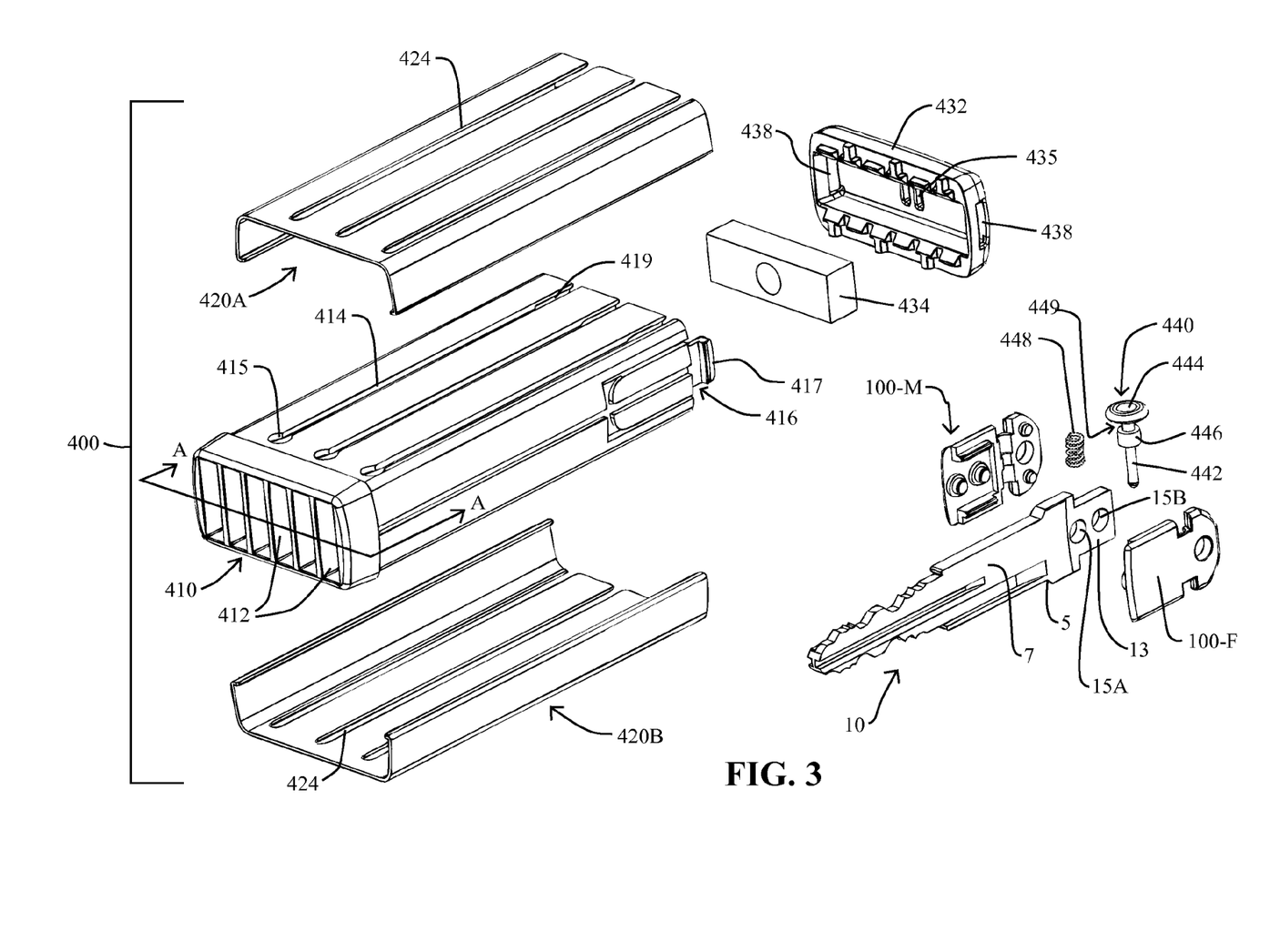
FIG. 3 is a front exploded perspective view of a particular key organizer for storing key assemblies 10 of FIG. 2.

FIG. 3 is a front exploded perspective view of a particular key organizer for storing key assemblies 10 of FIG. 2. As illustrated, the key organizing device 400 includes a plastic housing 410 and an end cap 432. A plurality of key assemblies 10 can slide within channels 411 defined by walls 412 of the housing 410. Each channel 411 includes a top or bottom slider slot 414, each of which is terminated at the front end by a detent 415, shown as a circular orifice. Additionally, a damper 434, such as foam, limits the movement of the key assemblies 10 in the housing 410 when retracted and muffles sound created by movement of the key assemblies 10 in the housing 410. In a particular embodiment the plastic housing 410 is injection molded from EXL 1414 polycarbonate.

As shown, the key organizing device 400 further includes a housing sleeve or sleeves 420A, 420B that can be permanently or removably affixed to the housing 410 to protect the housing 410 and provide added strength and aesthetic value to the key organizing device 400. The sleeves 420A, 420B can be attached to the housing 410 utilizing tape, glue, or snaps (not shown). When assembled, the sleeves 420A, 420B include slots 424 that are registered to the slider slots 414 in the housing 410. As shown, the two sleeves 420A, 420B are identical but that is not necessary. To customize the key organizer, the sleeves can be metal or plastic, and can have any suitable finish, such as polished steel, anodized aluminum, titanium, carbon fiber, wood, or wood grain patterns. The sleeve can also be a pliable material or can be textured.

The housing can hold a plurality of standardized key assemblies 10 positioned in alternative opposing relationships to one another such that every neighboring key assembly 10 is positioned in an opposing direction. The key assemblies 10 are disposed in the channels 411 within the housing 410 that are separated by the wall members 412 to guide the standardized key assemblies 10 when slid in the longitudinal direction along the housing 410. In the illustrated example, a single standardized key assembly 10 is mounted within the housing 410 of the key organizing device 400.

Each key assembly 10 is constructed of a standardized key head 100 operated by an actuator 440. In this example, the actuator 440 is a spring-loaded pin assembly having a head 444 for engaging the key assembly 10 through aligned slots 414, 424. Although shown rounded, each individual actuator head 444 can have a particular shape, texture, or color to help distinguish the function of the keys within the housing.

As illustrated, the housing 410 has three slider slots 414 on the top side and three slider slots on the bottom side (not shown). The pin portion 442 of the actuator 440 includes a stop mechanism 446 that fits snugly in the front detents 415 of the housing to prevent the key assemblies from moving within the channels once extended. When the head 444 of the actuator 440 is depressed, by applying pressure to the pin assembly, the stop mechanism 446 is moved into the cavity of the housing channel, thereby releasing the stop mechanism 446 from the respective detent and disengaging the corresponding key assembly 10, which allows it to move longitudinally along the housing channel to retract or extend the standardized key assemblies. The back end of the slider slots 414 can also include a detent 419 to engage with the stop mechanism 446 to help retain the key assembly in the retracted position. In particular, channel dimensions that exceed the standardized head dimensions (width and thickness) by less than 0.005 (such as 0.001-0.005) inch to inhibit rattling due to a snug fit and to provide for sufficiently smooth operation.

More particularly, when assembled, the stop mechanism 446 of the pin assembly 440 extends just over the top edges of the opposing retaining side plates 100-M, 100F. This allows the stop mechanism 446, when the pin assembly 440 is in a resting position, to rest within the detents 415, 419, thereby retaining the position of the standardized key head and key blade in either a fully retracted or fully extended position. The pin is spring 448 loaded to both hold the stop mechanism 446 in an engaged relationship with the detents 415, 419 and to resist movement of the key assembly 10 by forcing it to the bottom of the channel 411. It also pre-loads the key assembly 10 when deployed (to prevent movement) and retracted (to prevent rattling). When the head 444 of the pin assembly 440 is depressed, the stop mechanism 446 is lowered into the actuator channels 105 (FIG. 5A-5B) at, or below, the top edge of the opposing side retaining plates 100-M, 100-F, which disengages the pin assembly 440 from the housing 410 and allows the key assembly 10 to slide longitudinally along the housing 410 in both directions.

In a particular embodiment, an unused pin assembly 440 can be stored inside the cover 432. More particularly, the pin 440 and spring 448 can be placed within an empty channel as long as the head's diameter is larger than the channel opening to prevent the head from falling into the channel. The cover 432 and foam 434 are then secured to the housing 410 to secure the pin assembly 440 in place.

The housing 440 includes two opposing tabs 416 spaced-apart for engaging the cover 432 for removable attachment of the cover 432 over the open back end of the housing 410. For example, the tabs 416 can be configured to have hook ends 417 for engagement with openings 438 on opposing sides of the cover 432. The hook end 417 of the tabs 416 may be disengaged from the tabs on the side slots of the housing 410, by pushing in the hook ends 417 through the openings 438 of end cap 432. Those skilled in the art will recognize alternative mechanisms for removably attaching the cover. Also shown is a lanyard receiving port 435 for attaching the organizer to a lanyard string (not shown).

Additionally, in this example, to prevent the unwanted removal of the cover 432 (for example when the key organizing device is dropped or tethered from a removable string, clip, or ring), the tabs 416 can only move inward and release the cover 432 when the key assemblies in the outermost channels are extended beyond the tab release. By moving the key assemblies downward and away from the tab releases, the mechanical interference is removed and the tabs 416 can be depressed inward to release the cover. Other release mechanisms can be employed, such as a latch assembly inside the cover 432.

Figure 4:
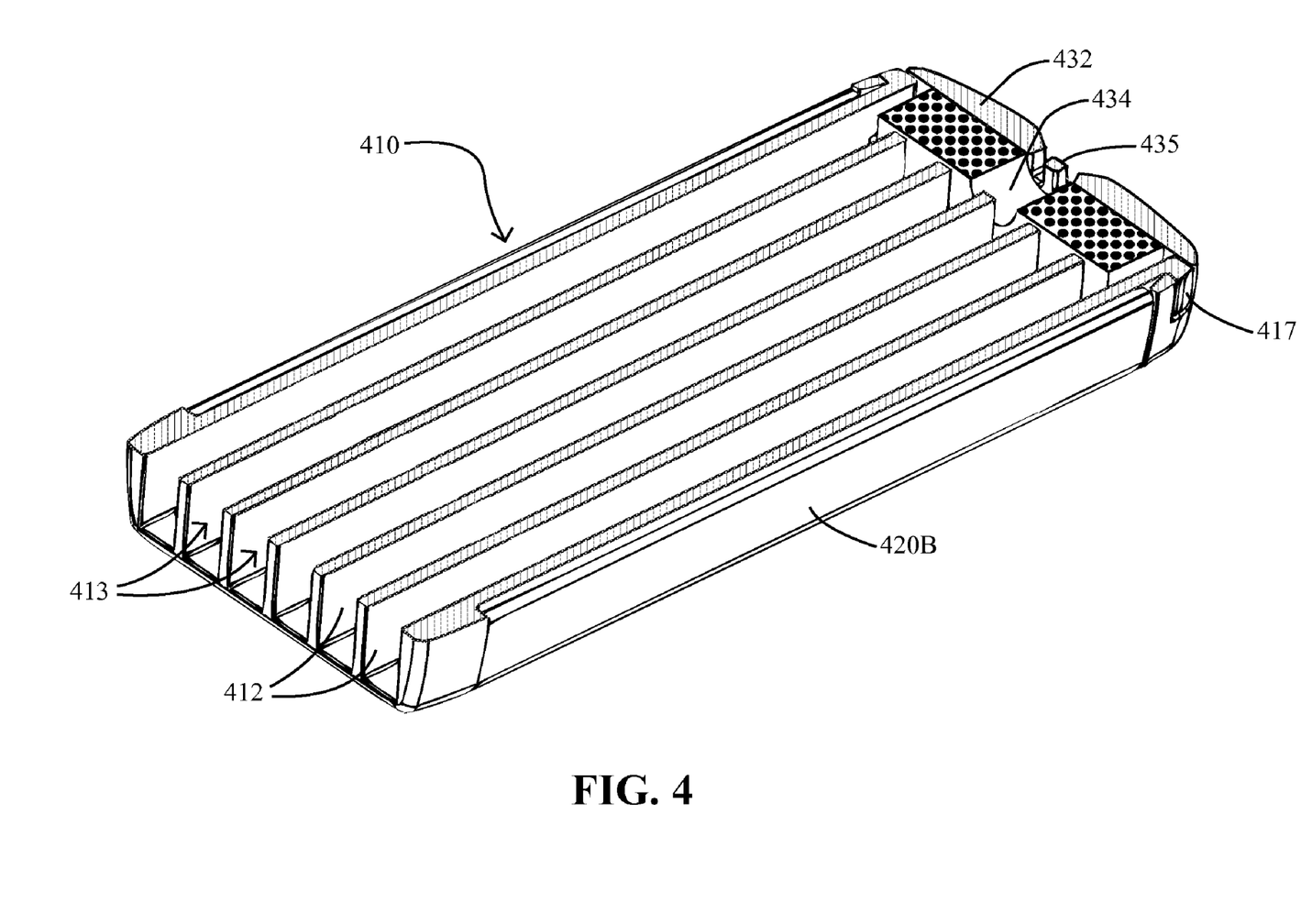
FIG. 4 is a perspective cross-sectional view an assembled organizer taken along lines A-A of FIG. 3.

FIG. 4 is a perspective cross-sectional view an assembled organizer taken along lines A-A of FIG. 3. As shown, because the section is taken along the center line of the housing 410, the sleeves 420 are not sectioned. Note that bezels are formed by the front of the housing 410 and the end cap 432 at the rear of the housing 410. Also shown is the lanyard port 435. Note the interaction between the hooks 417 and the end cap 432 through the openings 438.

As shown in FIG. 3, in a particular embodiment the standardized key head includes two retaining plates that sandwich a modified conventional key head.

Figure 5A:
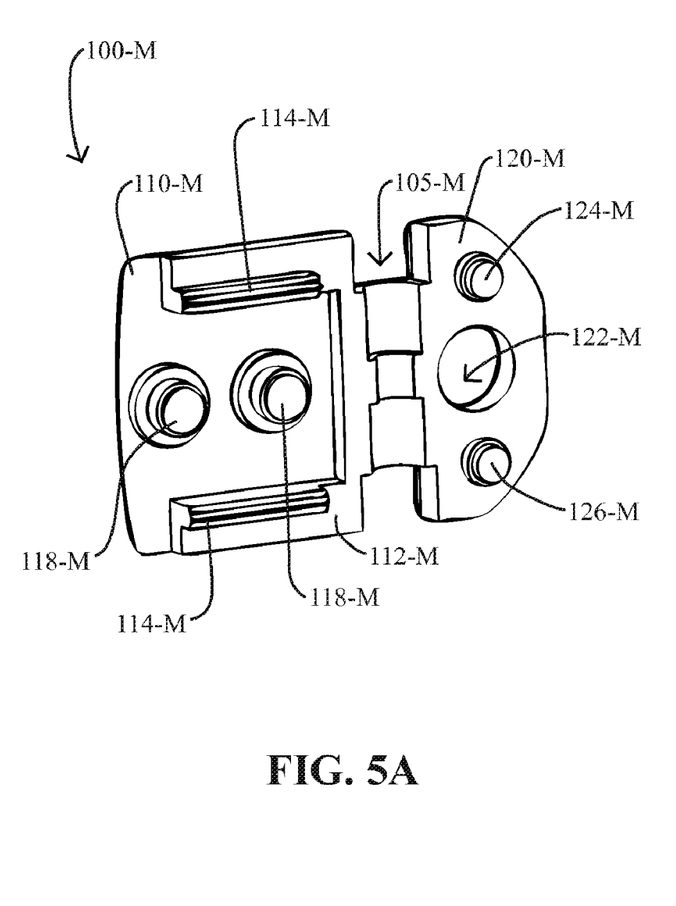
FIGS. 5A-5B are exploded perspective views of a particular standardized key head of FIG. 2.
Figure 5B:
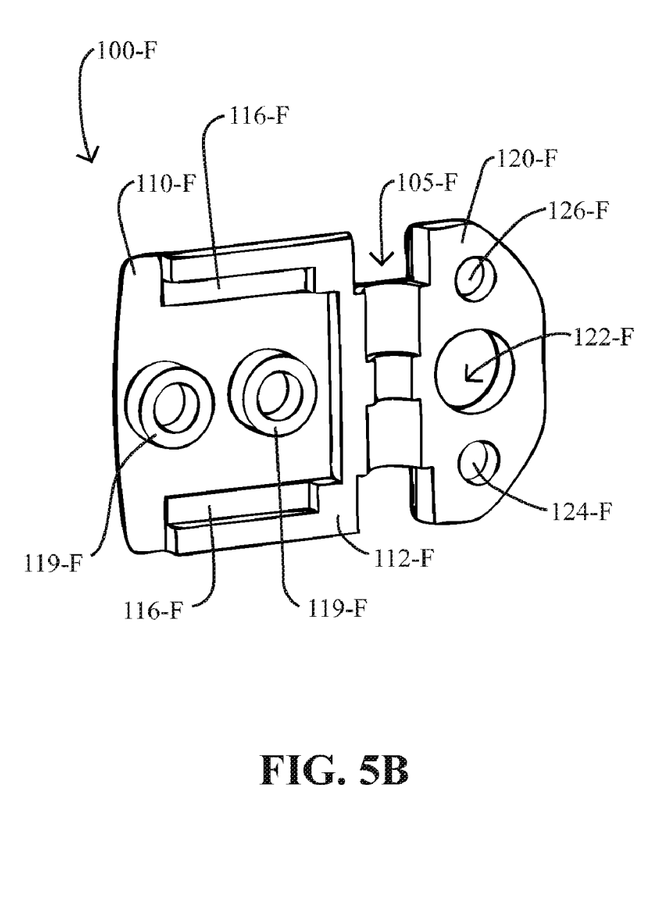

FIGS. 5A-5B are exploded perspective views of a particular standardized key head of FIG. 2. As shown, the standardized key head 100 includes two particular opposing first and second plastic side retaining plates 100-M, 100-F. In particular, the plastic comprises about 13% nylon. Instead of two separate retaining plates the standardized key head 100 can be injection molded directly on the key blade or press fit to integrate the standardized key head and key blade. In the illustrated example, the interior sides of the retaining plates 100-M, 100-F face one another when assembled to the key.

The retaining plates comprise a main plate 110-M, 110-F and a tail plate 120-M, 120-F separated by a bidirectional actuator channel 105-M, 105-F. The retaining plates 100-M, 100-F align and engage with one another through a locking or snap lock friction fit, or through welding procedures, including, but not limited to, ultrasonic welding.

The interior sides of the first tail plate 120-M includes male engagement members 124-M, 126-M. The interior sides of the second tail plate 120-F includes corresponding female engagement members 124-F, 126-F.

Each main plate 110-M, 110-F also includes a pocket for receiving the modified head or stub of a conventional key, regardless of the blade type. The pockets are defined by a shoulder 112-M, 112-F. The first shoulder 112-M includes a pair of projections 114-M and the second shoulder 112-F includes a corresponding pair of channels 116-F. Within the first pockets are male aligning projections 118-M and within the second pockets are corresponding female aligning projections 119-F. The male alignment projections 118-M and the female alignment projections 119-F engage with each other through one or more alignment holes 15A, 15B in a modified key stub.

The standardized head has an overall width of about 0.459-0.461 inch and the pockets have a width of about 0.260 inch to accommodate conventional keys having modified key heads with widths less than or equal to this dimension. The standardized head has a thickness of about 0.126-0.128 inch after welding. As can be appreciated, conventional keys can be adapted to receive the retaining plates 100-M, 100-F. While the side retaining plates 100-M, 100-F are shown as being separate pieces, it should be understood that they can be integrally fabricated with the key blade.

As shown in FIG. 3, the key head stub 13 includes a pair of mounting holes 15A, 15B through which the male and female engagement members 118-M, 119-F extend and mate. Those mounting holes 15A, 15B are formed from the original key head. In some cases, the original key head may not be large enough to accommodate the dimensions of both mounting holes.

Figure 6:
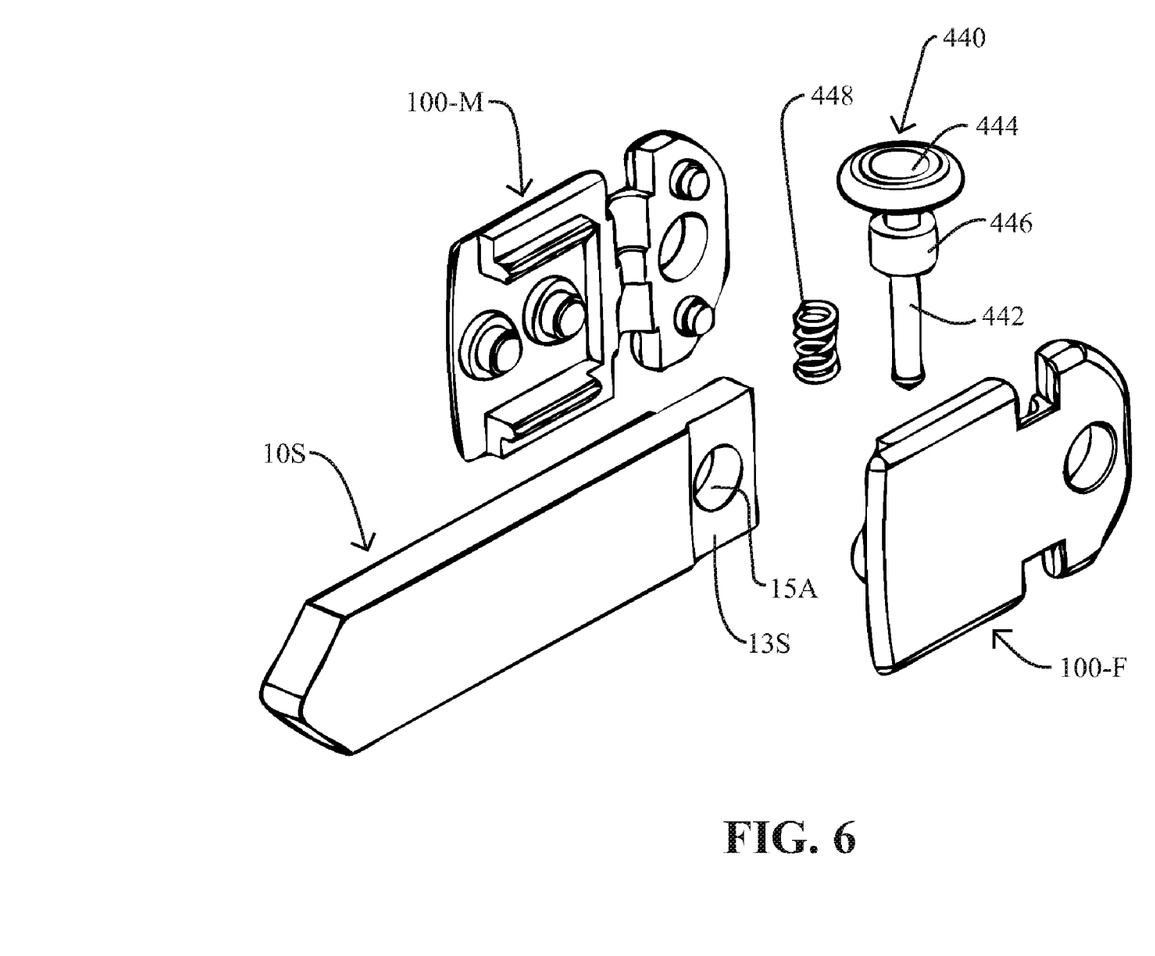
FIG. 6 is an exploded perspective view of a key assembly for a conventional key having a short head.

FIG. 6 is an exploded perspective view of a key assembly for a conventional key having a short head. If the original key head is shorter than the cutout, a single hole is used to receive the forward male and female engagement members 118-M, 119-F, as shown. The remaining void within the cutout region of the modified head can be filled with an insert (not shown) to provide structural reinforcement. Similarly, inserts can be used in those cases where the original key head is narrower than the cutout. Instead of inserts, the internal features and dimensions of the retaining plates can differ and thus multiple versions of the standardized key heads can be available and selected based on the key.

Figure 7:
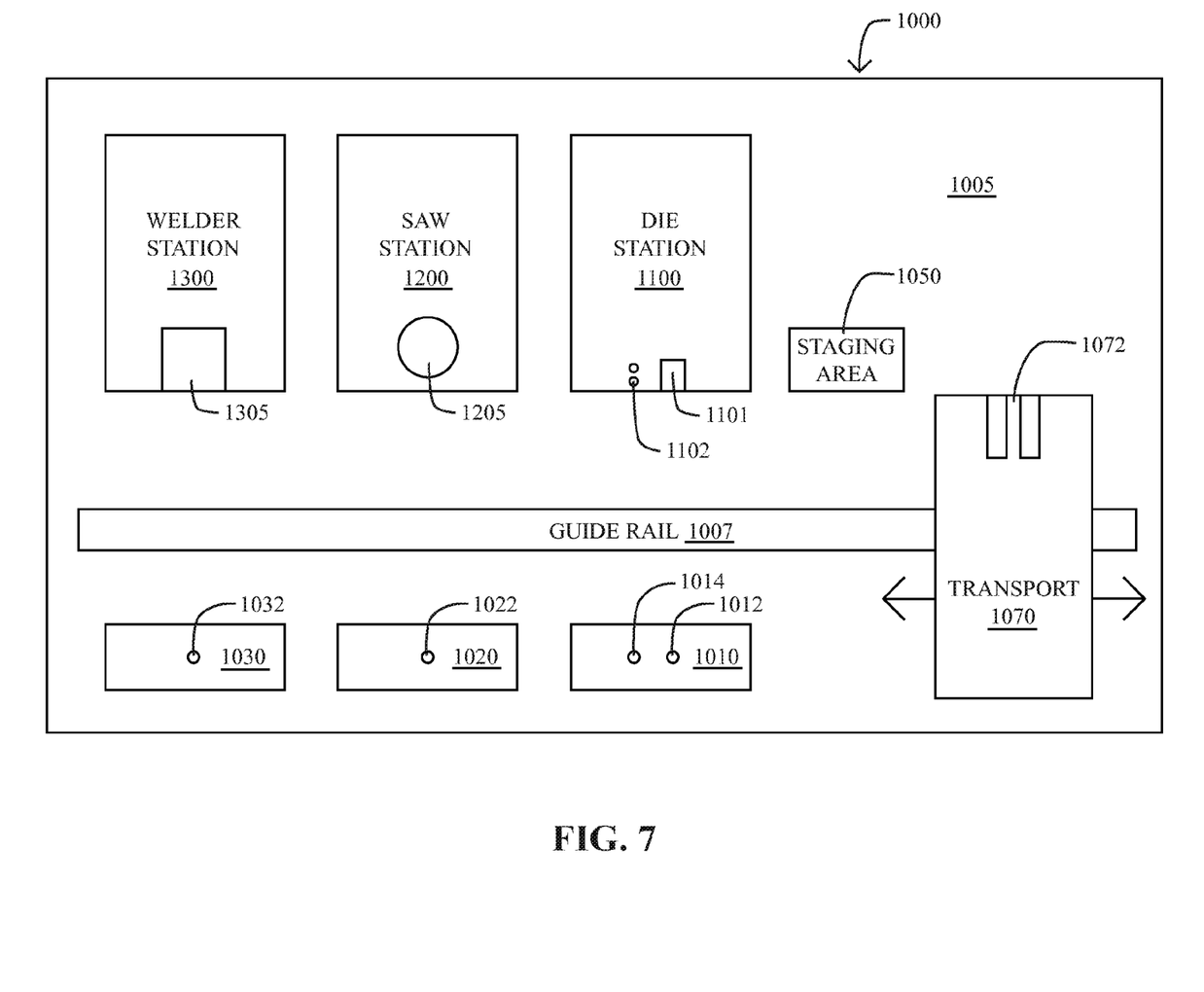
FIG. 7 is block diagram of a particular workstation for converting commercial keys into key assemblies.

FIG. 7 is block diagram of a particular workstation for converting commercial keys into key assemblies. Using the workstation 1000, a user can fabricate an arbitrary key into a standard profile and attach the standardized head. The workstation 1000 includes table 1005 on which a staging area 1050, a die station 1100, a saw station 1200, and a welding station 1300 are fixed. A transport platform 1070 moves along a transport guide rail 1007 and is registered to each station by mechanical stops 1012, 1014, 1022, 1032. In a particular embodiment the mechanical stops are holes formed in a plurality of frames 1010, 1020, 1030 mounted to the table 1005 in positions relative to respective stations 1100, 1200, 1300. The transport 1070 engages with the frames and a pin or prong engages with the appropriate stop.

As shown, the workstation is manually operated and requires an operator to convert conventional keys. However, the workstation can be automated to increase production speed.

In most cases the key will be converted before any patterns, teeth, or grooves are cut into the key blade. The key conversion workstation can, however, convert keys before or after patterns are cut. The user of the key conversion workstation must identify the material prior to the conversion process to ensure the tooling is set up to cut the harder materials such as steel without damaging the equipment. Many keys also have plastic heads that must be removed prior to converting to standardized key assemblies. Most conventional keys with plastic coated heads are also commercially available as key blanks with metal heads.

There are multiple operations used to convert conventional keys to key assemblies with a standardized key head that can be used for thousands of different shaped conventional keys. One goal of the operation as a whole is to reduce the size of the many conventional keys so the head is cut to the desired profile and attachable to the standardized key head. The method as illustrated below combines the different steps into a compact and efficient workstation where an operator positions the conventional key and runs it through the various steps to attach the standardized head. The method could be automated and duplicated to increase the output.

It is also possible to manufacture the key assemblies with similar processes as the key conversion workstation, but doing so may not be economical due to the high cost of setup for the vast array of key manufacturers, conventional keys, various processes used by different key manufacturers, the increasing number of high security keys that are unable to be duplicated on a standard key duplicator, and feasibility of all the various manufacturers adopting the standardized key head. Therefore the key conversion workstation can be used to convert conventional keys to one-size-fits-all key assemblies.

The key conversion workstation employs a series of steps to process the conventional keys. The conventional keys are secured in the transport 1070 by a fixture 1072 as they move and lock into place at the stop frames 1010, 1020, 1030 for each station 1100, 1200, 1300. The transport fixture 1072 is adjustable to accommodate a wide variety of conventional key sizes and shapes.

The transport fixture 1072 centers and secures the conventional keys and the length of cut can be adjusted using a sliding bar. Once the desired length is achieved, the sliding bar is secured utilizing a retaining knob and pulling a lever that locks two transport jaws. The jaws move together simultaneously to center and secure the key as required through the process. Due to the vast array of conventional key shapes and sizes the transport jaws can be replaced to accommodate and securely clamp various sizes, forms, and shapes of conventional keys. There are many forces applied to the key as it goes through the conversion steps to create a modified key assembly. If the conventional key is not secured appropriately throughout the process, the conventional key may be cut inappropriately or fly out of the transport jaws or miscut. The steps will now be described in more particular detail.

In the first step, the transport 1072 is positioned at the main staging area 1050. At the staging area 1050, a conventional key is positioned and secured in the transport fixture 1072. If provided, any plastic key head cover is also removed from the key. The key blade is clamped so the head is parallel to the workstation's work surface. Therefore, various interchangeable clamping devices are utilized for different conventional key forms. The transport 1070 can also be adjusted to cut the key blade to the desired length.

Figure 8A:
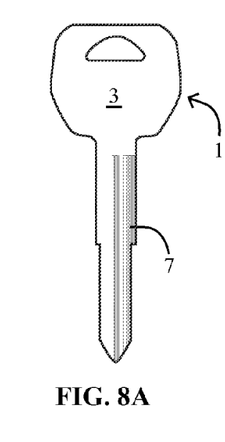
FIGS. 8A-8B are a front plane view and a side plane view, respectively, of a conventional key after completion of the first step.
Figure 8B:
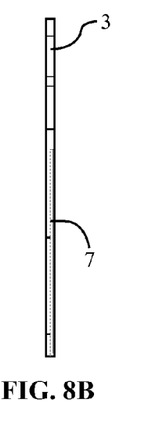

FIGS. 8A-8B are a front plane view and a side plane view, respectively, of a conventional key after completion of the first step. Note the key head 3 and blade 7 of the key 1.

Returning to FIG. 7 for the second step, the transport 1070 moves the prepared key from the staging area 1050 to the die station 1100 at the first stop 1012. The transport 1070 is positioned so the key head is under a cutting die 1101. The die is then activated by the user and the head is die-cut to the appropriate standardized profile.

Figure 9A:
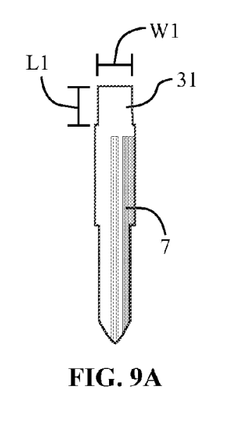
FIGS. 9A-9B are a front plane view and a side plane view, respectively, of the key of FIGS. 8A-8B after completion of the second step.
Figure 9B:
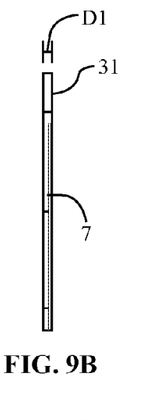

FIGS. 9A-9B are a front plane view and a side plane view, respectively, of the key of FIGS. 8A-8B after completion of the second step. As shown, the original key head 3 (FIG. 8A) has been reduced to a proto-stub 31. The proto-stub 31 has a specified width W1 and thickness D1. The length L1 of the proto-stub 31 has a maximum value, which may be limited by the dimensions of the material in the original key head 3.

Returning to FIG. 7 for the third step, the transport 1070 moves the profiled key from the first stop 1012 to the hole cutting die 1102 at the second stop 1014 on the die station 1100. A pair of longitudinal separated mounting holes is cut in the key head to receive both mated engagement members in the standardized head to secure the head. For smaller keys, as described above, only a single hole may be cut in the head to receive the forward-most mated engagement members in the standardized head and still allow ample blade length.

Figure 10A:
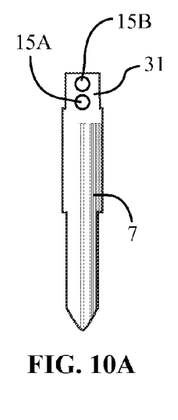
FIGS. 10A-10B are a front plane view and a side plane view, respectively, of the key of FIGS. 9A-9B after completion of the third step.
Figure 10B:
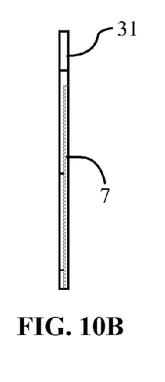

FIGS. 10A-10B are a front plane view and a side plane view, respectively, of the key of FIGS. 9A-9B after completion of the third step. As shown, the proto-stub 31 includes the holes 15A, 15B for receiving the replacement head. While the holes are shown as being circular, other geometries can be utilized.

Returning to FIG. 7 for the fourth step, the transport 1070 moves the key from the cutting position to the saw station 1200 at the third stop 1022. At the saw station 1200, two parallel saw blades 1205 are centered vertically on the head. Regardless of the key blade thickness, the saw blades are then operated to shave material off the top and bottom surfaces of the head to achieve a uniform thickness (0.070 inch) profile to attach the standardized head.

Figure 11A:
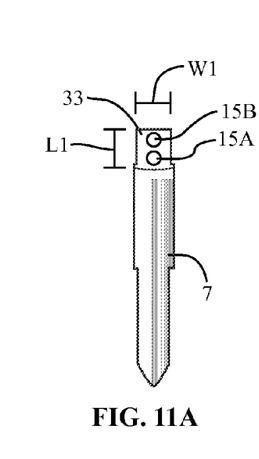
FIGS. 11A-11B are a front plane view and a side plane view, respectively, of the key of FIGS. 10A-10B after completion of the fourth step.
Figure 11B:
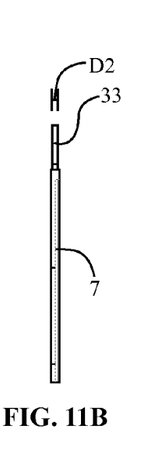

FIGS. 11A-11B are a front plane view and a side plane view, respectively, of the key of FIGS. 10A-10B after completion of the fourth step. As shown, the stub is complete with the specified thickness D2.

Returning to FIG. 7 for the fifth step, the key is moved by the transport 1070 to the welding station 1300 at the fourth stop 1032, where the standardized replacement head is mounted to the key stub at a welder staging area 1305. In addition, any RFID chip and coil from the original key head can be positioned within the replacement head. The replacement head is attached to the key stub using an ultrasonic welder to weld the two halves of the replacement head to the key stub to form an integrated assembly.

Figure 12A:
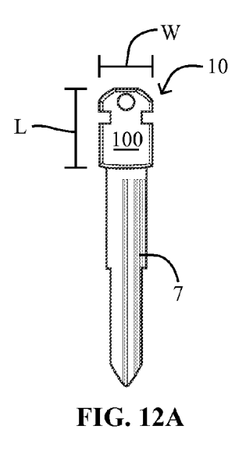
FIGS. 12A-12B are a front plane view and a side plane view, respectively, of the key of FIGS. 11A-11B after completion of the fifth step.
Figure 12B:
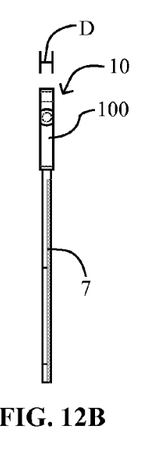

FIGS. 12A-12B are a front plane view and a side plane view, respectively, of the key of FIGS. 11A-11B after completion of the fifth step. As shown, the replacement head 100 has been integrally welded to the stub to complete the modified key 10.

In addition, the heads can be marked with the individual key codes utilizing a permanent polyester sticker or laser marking device (not shown).

During the conversion process, it should be appreciated that the overall length of the conventional key is reduced significantly by removing the key's head. Various issues can arise if the converted keys do not retain a suitable blade length. If the blade is too short, the key could bottom out in the keyway and never reach the positive stop on the shoulder of the tip before the blade's teeth engage with the lock pins within the keyway. If the blade is cut too long the tip of the blade could protrude out from the key organizing device in the resting position. Other issues could also arise when used in the key organizing device, such as the device sticking too far out of a vehicle ignition. Because the majority of key blades measure 2 inches or less in length, a particular embodiment of the key organizer fits keys with blades equal to or less than this length, although the device can be longer or shorter to accommodate different key lengths.

While this invention has been particularly shown and described with references to particular embodiments, it will be understood by those skilled in the art that various changes in form and details may be made to the embodiments without departing from the scope of the invention encompassed by the appended claims.

I claim:

1. A method of manufacturing a standardized pocket tool for a universal organizer, comprising:
    providing an elongated pocket tool having a working end and a gripping end along a longitudinal axis;
    machining the gripping end into a mounting stub having a mounting feature, the mounting stub having a predetermined thickness, a predetermined width, and a maximum length relative to the longitudinal axis;
    providing a first mounting plate having a first mating feature and a second mounting plate having a second mating feature, the first mating feature dimensioned to mate with the second mating feature;
    positioning the mounting stub between the first mounting plate and the second mounting plate such that the mounting feature of the mounting stub is aligned with the first mating feature of the first mounting plate and the second mating feature of the second mounting plate;
    engaging the mounting feature with the first and second mating features; and
    integrating the first mounting plate with the second mounting plate to secure the mounting stub within an integrated mounting head.

2. The method of claim 1 wherein the elongated hand tool is a key.

3. The method of claim 1 wherein the elongated hand tool is an electronic device.

4. The method of claim 1 wherein machining the gripping end includes machining an orifice through a proto-stub as a mounting feature.

5. The method of claim 4 further comprising machining a plurality of orifices through the proto-stub.

6. The method of claim 1 wherein integrating comprises welding.

7. The method of claim 1 wherein providing the mounting plates comprises forming the first mounting plate and the second mounting plate from a plastic material.

8. The method of claim 7 wherein the plastic material comprises nylon.

* * * * *